Figure 1:
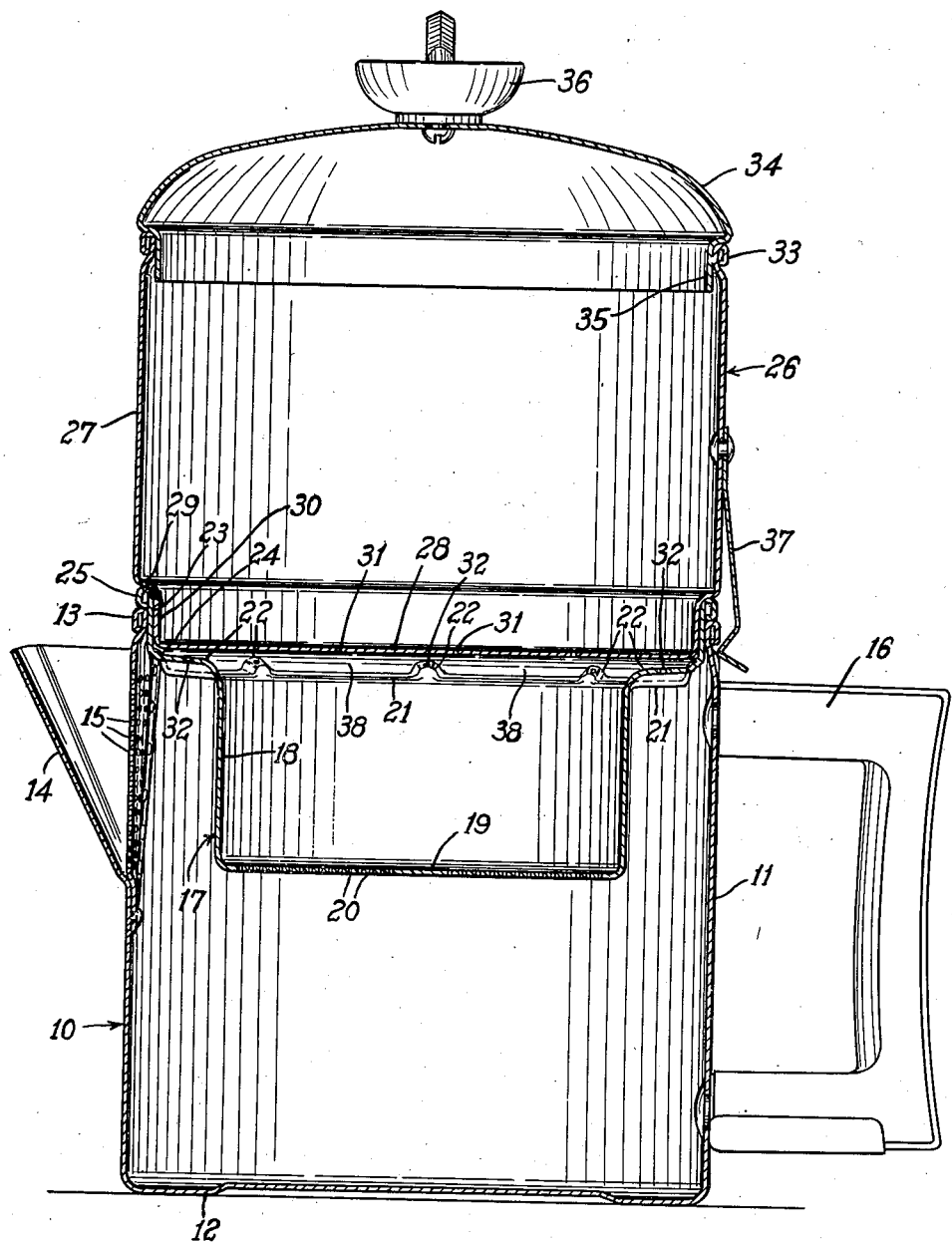

INVENTOR.
Richard F. Krause
BY
ATTORNEYS

Patented Dec. 4, 1951

2,577,200

UNITED STATES PATENT OFFICE 2,577,200

COFFEE BASKET FOR DRIP COFFEE MAKERS

Richard F. Krause, Massillon, Ohio, assignor to The Enterprise Aluminum Company, Massillon, Ohio, a corporation of Ohio Application April 22, 1950, Serial No. 157,570

3 Claims. (Cl. 99—306)

The invention relates to drip coffee makers, and more particularly to certain improvements in the coffee basket for such devices.

Drip coffee makers of the type referred to comprise a beverage receptacle or pot, a ground coffee basket, having a perforate bottom wall, suspended within the upper portion of the pot, and a water reservoir located directly above the coffee basket and having relatively few small apertures in its bottom wall, whereby when boiling water is placed in the water reservoir it will gradually drip upon the ground coffee in the coffee basket, extracting the strength from the ground coffee during this leaching action, the coffee beverage dripping from the perforate bottom of the coffee basket into the beverage receptacle or pot.

When the boiling water from the water reservoir contacts the ground coffee in the coffee basket, gases are produced, causing an effervescence or ebullition of the water, so that it bubbles up and foams in the upper portion of the coffee basket, and frequently has a tendency to overflow the coffee basket and run down over the outside of the beverage pot.

In my prior Patent No. 1,743,925 dated January 14, 1930, I provided means for overcoming this difficulty by forming an annular shoulder in the upper portion of the coffee basket, said shoulder having a multiplicity of apertures therein to provide relief for the ebullition or effervescence caused by contact of the boiling water with the ground coffee.

While that arrangement overcame the difficulties above referred to by preventing the water from overflowing the coffee basket and running down the sides of the beverage container or pot, the same was objectionable because it permitted a considerable quantity of the water to pass through the multiplicity of apertures directly into the coffee beverage in the pot, thus unnecessarily diluting the same.

The object of the present invention is to improve and simplify the construction of coffee baskets for drip coffee makers so as to overcome the above mentioned difficulties and objections.

Another object is to provide a coffee basket of the character referred to, having a substantially horizontal, annular, outwardly disposed shoulder in its upper portion provided with a plurality of radially disposed ribs thereon extending upward to a point near the perforate bottom of the hot water reservoir, there being an aperture in the top of each rib.

A further object is to provide such a coffee basket in which this annular shoulder is slightly inclined inwardly so as to tend to drain any overflow of water back into the coffee basket into contact with the ground coffee therein.

Figure 2:
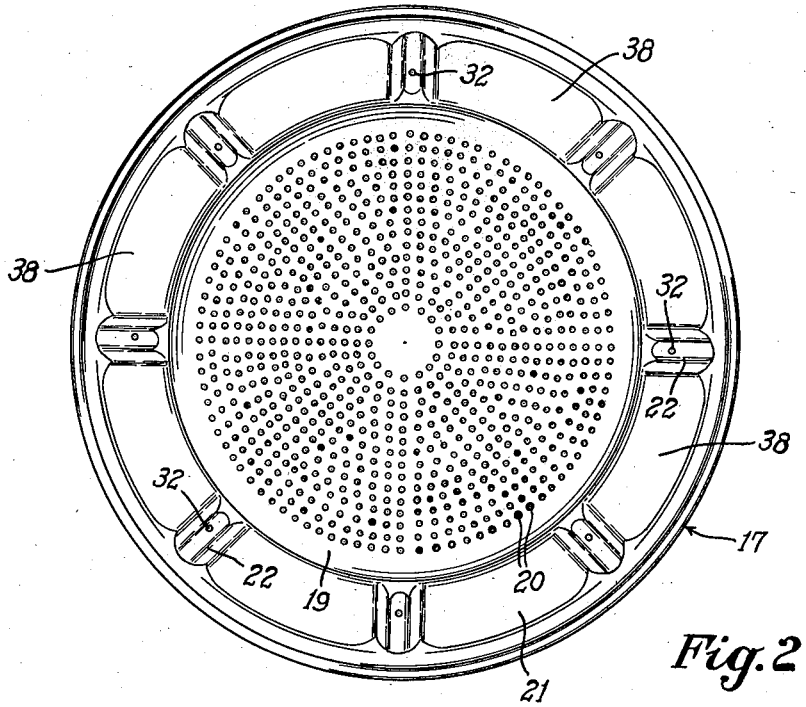
Figure 3:
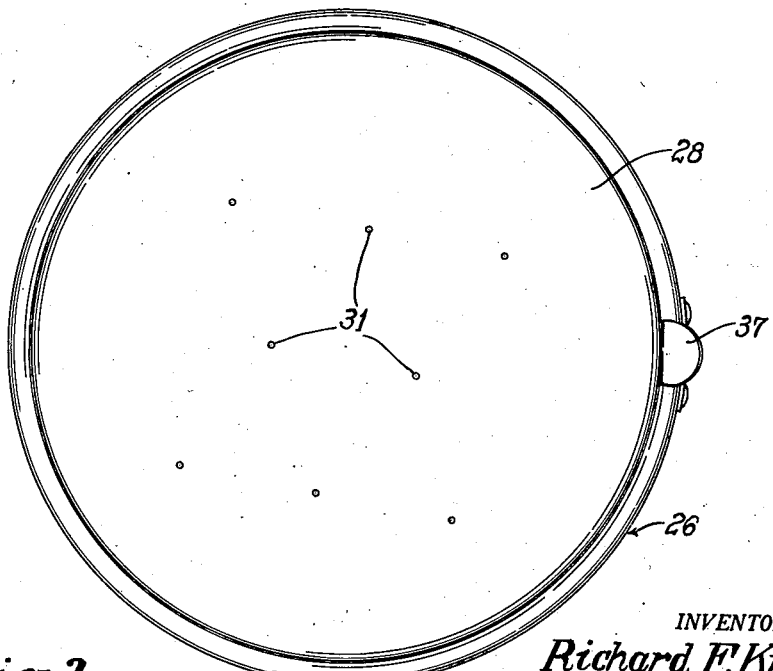

The above objects together with others which will be apparent from the drawings and following description or which may be later referred to, may be attained by constructing the improved coffee basket in the manner hereinafter described in detail and illustrated in the accompaying drawings, in which:

Figure 1 is a vertical, sectional view through a drip coffee maker provided with a coffee basket constructed in accordance with the invention;

Fig. 2 a top plan view of the ground coffee basket to which the invention pertains; and, Fig. 3 a bottom plan view of the hot water reservoir.

The coffee beverage receptacle, or pot, is indicated generally at 10 and may be of conventional design, arranged to receive the coffee beverage and dispense the same as in usual and well-known manner in drip coffee makers.

This beverage receptacle, or pot, may comprise the substantially cylindrical side walls 11 and the flat bottom wall 12, the upper end of this container being preferably provided with a bead 13.

A spout 14, of any usual and well-known construction, is attached to one side of the pot, near the upper end thereof, and communicates with the interior of the pot, as through the usual plurality of perforations 15, and a handle 16, of any suitable construction, is connected to the side wall of the pot, diametrically opposite to the spout, so as to provide for easily manipulating the same to pour the coffee beverage through the spout 14.

The ground coffee basket, indicated generally at 17, is adapted to be mounted within the upper portion of the pot 10, as is customary in drip coffee makers of this general character. This coffee basket comprises the cylindrical, imperforate side wall 18, of considerably less diameter than the inside diameter of the pot 10, and the flat, perforate bottom wall 19 which may be provided with the usual multiplicity of small apertures 20 covering substantially the entire area of the bottom wall.

An outwardly disposed, substantially horizontal, annular shoulder is provided at the upper portion of the coffee basket, and may be in the form of the peripheral flange 21 which, as shown in Fig. 1, is preferably inclined slightly inward, or toward the interior of the coffee basket.

A plurality of radially disposed ribs 22 are formed upon the upper surface of the flange 21, these ribs being preferably hollow, as shown in Fig. 1, and formed by stamping or pressing them in the sheet metal from which the coffee basket is formed.

An upwardly disposed, annular flange 23 is formed at the periphery of the flange 21 and an inwardly disposed annular shoulder 24 is formed in the flange 23 which is above the tops of the radial ribs 22. The flange 23 is adapted to have a sliding fit within the beaded open upper end 13 of the beverage receptacle, or pot 10, and this flange is provided at its upper end with a bead 25 adapted to seat upon the bead 13 of the pot, as shown in Fig. 1.

The hot water reservoir, indicated generally at 26, may be of conventional design and comprises the cylindrical side wall 27, terminating at a point spaced above the bottom wall 28 in the inwardly disposed annular shoulder 29, adapted to seat upon the top of the bead 25 of the coffee basket, the side wall being then reduced in diameter as at 30, so as to have a sliding fit within the flange 23 of the coffee basket.

The bottom wall 28 of the hot water reservoir is provided with a few spaced, minute apertures 31, as in usual practice. As shown in Fig. 1 when the parts of the drip coffee maker are assembled this perforate bottom wall 28 of the hot water reservoir is spaced very slightly above the top of the radially disposed ribs 22 of the coffee basket, being located at or adjacent to the annular shoulder 24 of the coffee basket. It should be noted that each of these ribs 22 is provided with a single minute aperture 32 in its top wall.

The upper, open end of the water reservoir is preferably beaded, as indicated at 33, and the lid or cover 34 is of conventional construction and provided with the depending, cylindrical flange 35, adapted to slidably fit within the bead 33. A knob 36 may be provided upon the cover for manipulating the same.

For the purpose of holding the parts tightly together in assembled condition, as shown in Fig. 1, and permit pouring of the coffee beverage from the pot 10, without the necessity of removing the water reservoir 26 or coffee basket 17 from the pot, a spring catch 37 may be provided upon the reservoir and adapted to fit under the rim bead 13 of the pot so as to prevent the water reservoir and coffee basket from becoming accidentally disengaged from the pot when the same is tilted.

In the operation of the drip coffee maker, in order to make drip coffee, the desired amount of ground coffee is placed in the coffee basket 17, which is then positioned within the upper portion of the pot 10, and the water reservoir 26 in then placed in position above the coffee basket, all as shown in Fig. 1.

The proper amount of boiling water is then poured into the water reservoir 26 and the cover placed thereon. The hot water will be discharged by gravity from the reservoir through the apertures 31 in the bottom thereof, into the coffee basket, being gradually supplied thereto, and will pass through the ground coffee in the basket, extracting the strength therefrom, after which the coffee beverage thus produced will drip through the apertures 20 in the bottom of the coffee basket into the beverage receptacle or pot 10.

When the boiling water from the reservoir first contacts the ground coffee in the coffee basket, it will cause an ebullition or effervescence, the water and foam thus produced bubbling or boiling up in the upper portion of the coffee basket and tending to overflow the same.

The enlarged area at the top of the coffee basket, produced by the annular flange 21 extending outward from the reduced, cylindrical portion 18 of the coffee basket to the upright annular flange 23 thereof, and spaced below the bottom 28 of the water reservoir as shown in Fig. 1, provides adequate space for receiving this overflow of water and foam.

As shown in the drawings this space is divided, by the radial ribs 22, into a plurality of pockets 38, having inclined bottom walls, so that as this effervescence or ebullition subsides, the water and foam which has overflowed into these pockets will be drained back into the coffee basket, so that it may pass through the ground coffee, extracting the strength therefrom, and will drip from the perforate bottom of the coffee basket into the beverage container or pot, and the coffee beverage will thus not be diluted by the discharge of any considerable amount of clear water into the same.

The single apertures 32 in the tops of the radial ribs 22 permit the free passage of air therethrough, between the coffee basket and the beverage container or pot. These apertures are located above the level and the pressure of the water and the coffee grounds, so that they are at all times free for the passage of air from the coffee basket without any clogging of the apertures by the water or grounds, and free from the swelling pressure thereof.

It will be seen that if there is any surplus overflow which will not quickly drain back from the flange 21 into the coffee basket, the same may drip through the apertures 32.

From the above it will be evident that a simple, practical and efficient coffee basket is provided which obviates the disadvantages and difficulties above referred to and which prevents the overflow of water and foam from the coffee basket down the outside of the pot, and at the same time prevents the coffee beverage from being unduly diluted by the overflow of clear water into the beverage.

I claim:

1. In a drip coffee maker provided with a water reservoir having apertures in its lower portion, a coffee basket located below the water reservoir and having a perforate bottom wall and upright side walls of smaller diameter than the water reservoir, an outwardly disposed imperforate annular flange at the top of the side walls of the coffee basket, said flange being spaced below the bottom of the water reservoir, radially disposed hollow ribs upon the top of said flange the top of the ribs being spaced slightly below the bottom of the water reservoir, there being an aperture in the top of each rib, and an upright annular flange at the periphery of the outwardly disposed flange and fitting upon the lower portion of the water reservoir.

2. In a drip coffee maker provided with a water reservoir having apertures in its lower portion, a coffee basket located below the water reservoir and having a perforate bottom wall and upright side walls of smaller diameter than the water reservoir, an outwardly disposed imperforate annular flange at the top of the side walls of the coffee basket, said flange being spaced below the bottom of the water reservoir, and being slightly inclined inwardly and downwardly toward the interior of the coffee basket, radially disposed hollow ribs upon the top of said flange the tops of the ribs being spaced slightly below the bottom of the water reservoir, there being an aperture in the top of each rib, and an upright annular flange at the periphery of the outwardly disposed flange and fitting upon the lower portion of the water reservoir.

3. In a drip coffee maker provided with a water reservoir having apertures in its lower portion, a coffee basket located below the water reservoir and having a perforate bottom wall and upright side walls of smaller diameter than the water reservoir, an outwardly disposed imperforate annular flange at the top of the side walls of the coffee basket, said flange being spaced below the bottom of the water reservoir, radially disposed hollow ribs upon the top of said flange, there being an aperture in the top of each rib, an annular shoulder at the periphery of said annular flange and located above the tops of the radial ribs forminng a stop for spacing the bottom of the water container above the tops of said radial ribs, and an upright annular flange at the periphery of the outwardly disposed flange and fitting upon the lower portion of the water reservoir.

RICHARD F. KRAUSE.

REFERENCES CITED

The following references are of record in the file of this patent:

UNITED STATES PATENTS

| Number | Name | Date |
| --- | --- | --- |
| 227,805 | Mather | May 18, 1880 |
| 992,262 | Savage | May 16, 1911 |
| 1,885,666 | Wood | Nov. 1, 1932 |
| 1,954,551 | Wilcox | Apr. 10, 1934 |
| 1,964,151 | Günthrop | June 26, 1934 |
| 2,018,695 | Wilcox | Oct. 29, 1935 |
| 2,053,004 | Larsen | Sept. 1, 1936 |
| 2,360,570 | Mattoon | Oct. 17, 1944 |